United States Patent [19]

Witt

[11] Patent Number: 4,740,098
[45] Date of Patent: Apr. 26, 1988

[54] JOINT AND METHOD OF FORMING THE SAME

[76] Inventor: Brian D. Witt, 66 Dalry Road, Darlington, Australia

[21] Appl. No.: 852,952
[22] PCT Filed: Aug. 2, 1985
[86] PCT No.: PCT/AU85/00183
    § 371 Date: Apr. 1, 1986
    § 102(e) Date: Apr. 1, 1986
[87] PCT Pub. No.: WO86/01265
    PCT Pub. Date: Feb. 27, 1986

[30] Foreign Application Priority Data

Aug. 2, 1984 [AU] Australia .................. PG6360

[51] Int. Cl.[4] ............................ F16B 12/14
[52] U.S. Cl. ........................... 403/205; 403/231; 403/382; 403/403; 403/406.1
[58] Field of Search ........ 403/403, 231, 232.1, 403/405.1, 406.1, 381, 168, 186, 315, 402, 205, 382, 187; 52/656

[56] References Cited

U.S. PATENT DOCUMENTS

| | | | |
|---|---|---|---|
| 2,133,204 | 10/1938 | Max | 403/315 X |
| 3,307,294 | 3/1967 | Bienenfeld et al. | 52/656 X |
| 3,547,472 | 12/1970 | Ehrman | 403/381 |
| 3,664,011 | 5/1972 | Labastrou | 403/315 X |
| 3,695,655 | 10/1972 | Wippermann | 403/403 |
| 3,835,610 | 9/1974 | Harper et al. | 403/406.1 |
| 3,845,604 | 11/1974 | Ottosson | 403/231 X |
| 3,951,558 | 4/1976 | Komarov | 403/231 |
| 4,030,846 | 6/1977 | Flötotto | 403/402 X |
| 4,134,238 | 6/1979 | Auger | 52/656 X |
| 4,277,198 | 7/1981 | Beckman | 403/231 |
| 4,283,900 | 8/1981 | Schubert | 403/402 X |
| 4,616,950 | 10/1986 | Morris | 403/232.1 X |
| 4,626,124 | 12/1986 | LaRoche | 403/205 X |

FOREIGN PATENT DOCUMENTS

| | | | |
|---|---|---|---|
| 2836056 | 2/1980 | Fed. Rep. of Germany | 403/403 |
| 84235 | 11/1964 | France | 403/231 |
| 561859 | 5/1975 | Switzerland | 403/231 |

Primary Examiner—Randolph A. Reese
Assistant Examiner—Peter M. Cuomo

[57] ABSTRACT

A joint for joining two elongate members transversely to each other, comprising a first member, second member, right angle bracket and threaded bolt. The bracket is fixed to the first member and projects from the end face which is to be accommodated within a complementary recess provided on the second member. A transverse hole is provided in the recess extending between opposite side faces of the member, and axially registers with a threaded hole in the end projection of the bracket and a groove in a longitudinal recess on the first member. The bolt clampingly engages the second member to the bracket with the bolt shank further engaging the surfaces of the hole, groove and the terminal end of a protrusion of the bracket. The projection and the recess operate to oppose rotational movement of the first member about its longitudinal axis relative to the second member.

18 Claims, 4 Drawing Sheets

JOINT AND METHOD OF FORMING THE SAME

BACKGROUND OF THE INVENTION

This invention relates to a joint for use in joinery manufacture and a method of forming the same, which has particular application in the building and woodworking trades. Moreover, the particular joint herein described relates to a modernization of the traditional mortice and tenon joint which has been used in the joinery industry for many hundreds of years. Notwithstanding the advent of modern machinery to substantially improve the shaping of joinery stock and maintain cost effectiveness, there has been no suitable alternative to the manufacture of strong joints other than the traditional mortice and tenon joint. A difficulty with the mortice and tenon joint is that it does not readily offer itself to easy machining techniques and further necessitates the use of reinforcement to provide sufficient strength in certain situations.

It is an object of one form of the present invention to provide a joint in joinery manufacture which has strength characteristics comparable to a mortice and tenon joint.

It is a preferred object of the one form of the present invention to provide an improved joint which is a suitable alternative to the traditional mortice and tenon joint with respect to considerations of strength.

It is a further preferred object of the one form of the present invention to provide an improved joint which can be easily produced using modern machining techniques.

It is another preferred object of the one form of the present invention to provide an improved joint having superior strength characteristics in comparison to the traditional mortice and tenon joint.

SUMMARY OF THE INVENTION

In one form the invention resides in a joint for jointing two elongate members transversely to each other comprising: a first member provided with an end face; a second member provided with a pair of generally opposed side faces; a bracket means having a pair of flange portions disposed substantially transversely to each other; and a fixing means; said bracket means to be fixedly mounted to said end face such that one flange portion extends substantially parallel to the longitudinal axis of said first member and in juxtaposition therewith, and the other flange portion provides an outer projection from the general plane of said end face; said one side face having a part thereof to receive said end face and other flange portion, said part being complementary to said end face and having a recess to accommodate the outer projection of said other flange portion; wherein the first member is buttingly jointed to said part of said one side face of the second member by said fixing means clampingly engaging said second member to said other flange portion and wherein said other flange portion and said recess operate to oppose rotational movement of said first member about its longitudinal axis relative to said second member.

Preferably, the other flange portion overlies some of said end face to form the outer projection on said end face.

Preferably, the fixing means is a threaded bolt having a head and shank portion, said second member is provided with a transverse hole in the region of said part which extends between said opposed side faces, and said other flange portion is provided with a threaded hole which is positioned to register with said transverse hole, whereby said fixing means is receivable within said holes such that said head portion engages the other side face and the shank portion threadedly engages the other flange portion so as to clampingly engage the members together.

Preferably, the first member is provided with a longitudinal recess on one side face thereof to extend transversely to the other flange portion, said longitudinal recess defining a void inwardly of said threaded hole to accommodate any extension of said shank portion of the fixing means.

Preferably, the longitudinal recess is provided with a longitudinal groove to be axially aligned with said threaded hole, the width of said groove being approximate to the diameter of said threaded hole to provide a further engaging surface to said extended shank portion.

Preferably, the common end of said bracket means is disposed adjacent the recess.

Preferably, the bracket means is provided with an inwardly directed protrusion on the inner face of said one flange portion to be accommodated within said groove so locating the bracket means relative to the first member.

Preferably, the protrusion is partially accommodated within said groove and forms an outer side closure to the same adjacent said threaded hole to provide another engaging surface to said extended shank portion.

It is an object of another form of the present invention to provide a method of forming a joint having strength characteristics comparable to a mortice and tenon joint.

It is a preferred object of the other form of the invention to provide a method of forming a joint which is a suitable alternative to the traditional mortice and tenon joint with respect to considerations of strength.

It is a further preferred object of the other form of the invention to provide a method of forming a joint which can be easily produced using modern machining techniques.

It is another preferred object of the other form of the invention to provide a method of forming a joint having superior strength characteristics in comparison to the traditional mortice and tenon joint.

In another form, the invention resides in a method of forming a joint for jointing two elongate members transversely to each other comprising the steps of:

(i) fixedly mounting a bracket means having a pair of flange portions disposed substantially transversely to each other, to an end face of a first member, such that one flange portion extends substantially parallel to the longitudinal axis of said first member and in juxtaposition therewith, and the other flange portion overlies some of said end face to provide an outer projection thereon;

(ii) forming a recess in part of one side face of a second member complementary to the end face;

(iii) connecting the end face of the first member in butting relation to said part of said one side face of the second member; and (iv) clampingly engaging the second member to the other flange portion by a fixing means.

Preferably, the second member is clampingly engaged to the other flange portion by: forming a threaded hole in said other flange portion, forming a transverse hole in the region of said part to axially register with the threaded hole and which extends between opposing side faces of said second member, and inserting a threaded bolt having a head and shank portion to form the fixing means, within said holes so that the head portion engages the other side face and the shank portion threadly engages the other flange portion.

In a further form, the invention resides in a method of forming a joint of the kind defined in the first aforementioned form of the invention.

BRIEF DESCRIPTION OF THE DRAWINGS

The invention will be better understood in the light of the following description of several specific embodiments. The description is made with reference to the accompanying drawings wherein.

DETAILED DESCRIPTION OF THE PREFERRED EMBODIMENTS

Figure 1:
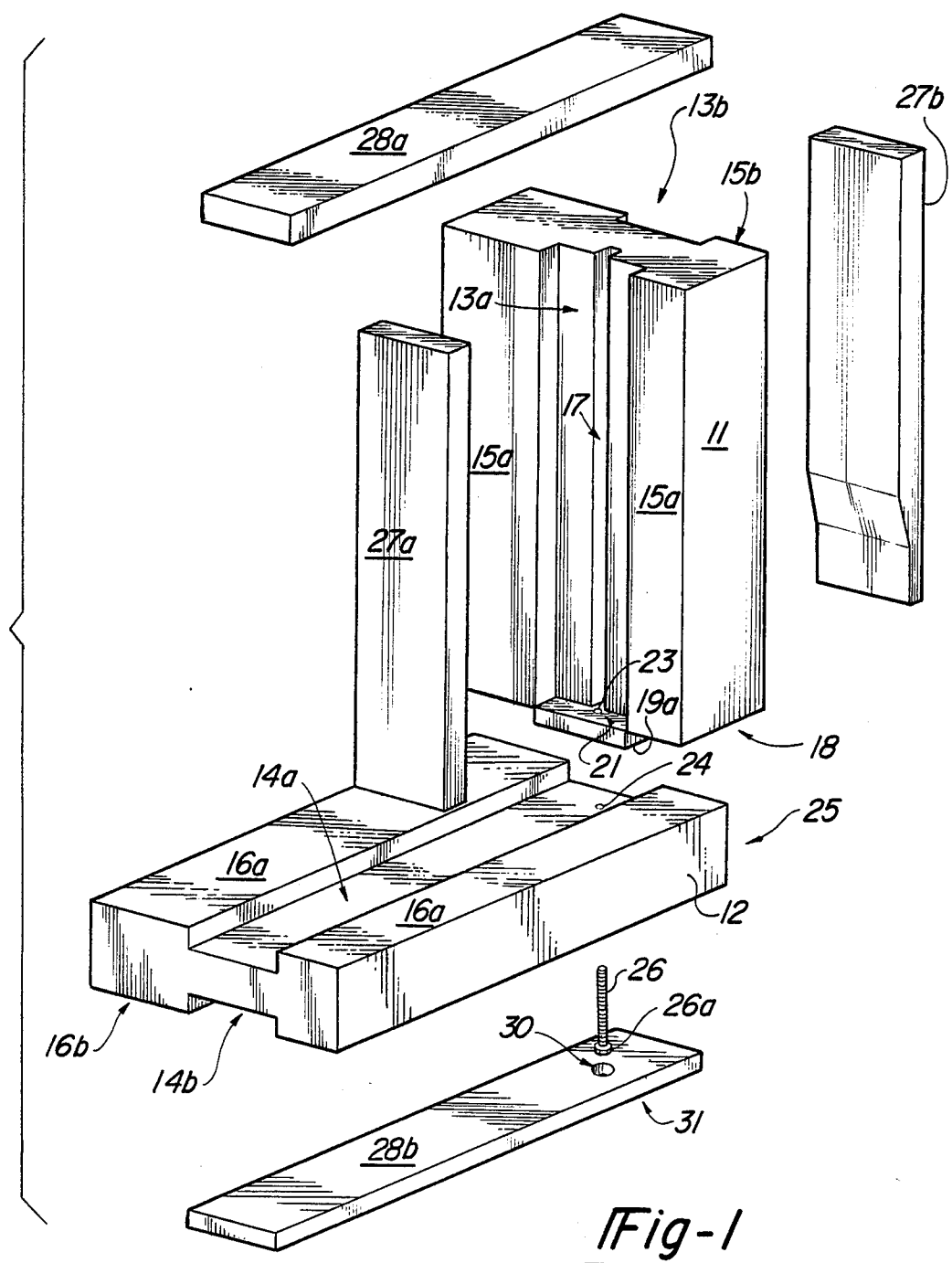
FIG. 1 is an exploded perspective view of the improved joint in accordance with the first embodiment of the invention.
Figure 2:
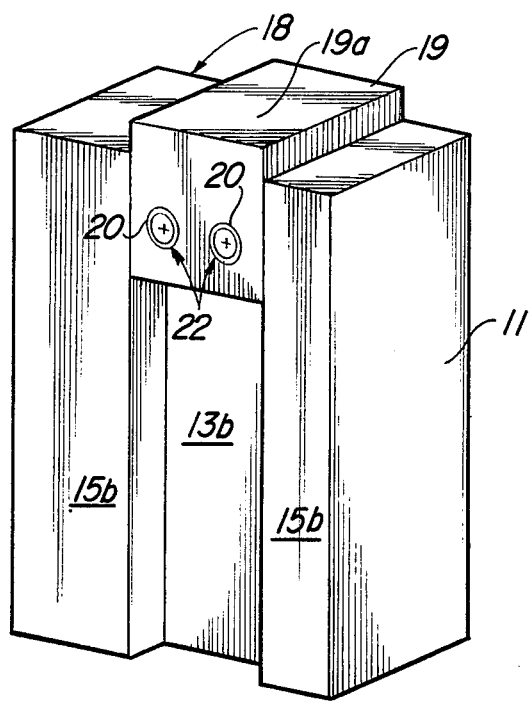
FIG. 2 is a perspective view showing the vertical member of the joint in FIG. 1 in an inverted position.
Figure 3:
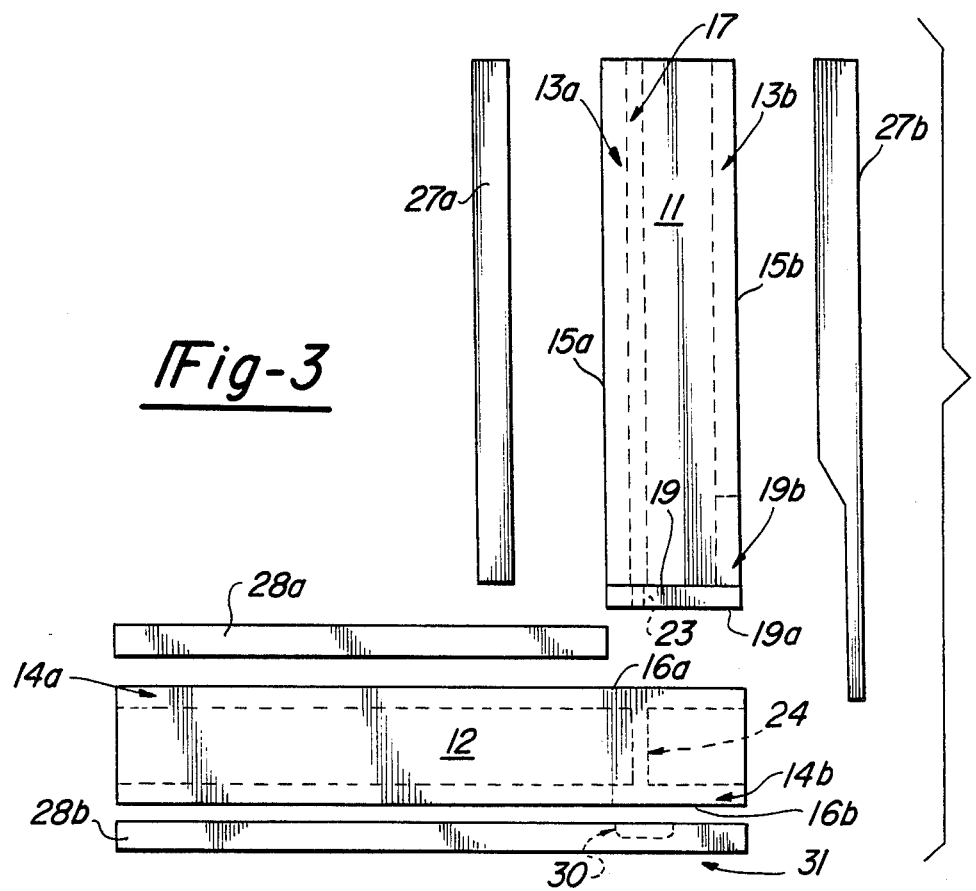
FIG. 3 is a front elevation of the improved joint shown in FIG. 1.

The first embodiment is directed towards an improved joint for use in timber joinery manufacture which provides a strong right angle joint particularly used for stiles, mullions, sills, and transoms.

In the present embodiment, the joint is adapted to adjoin two elongate timber members at right angles to each other, the first member 11 being vertical and the second member 12 being horizontal.

Both members, have corresponding longitudinal recesses in the form of rebates 13a, 13b and 14a, 14b respectively, routed within respective opposing side faces 15a, 15b and 16a, 16b each rebate extending substantially the length of the corresponding timber member. The inner rebate 13a of the vertical timber member 11 has a longitudinal groove 17 machined therein.

At the joining end of the vertical timber member 11 there is disposed an end face 18 and a bracket means in the form of a right angle metal plate 19 having one flange portion 19b which extends substantially parallel to the longitudinal axis of the first member 11 and in juxtaposition therewith, and another flange portion 19a which overlies the end face 18. The plate 19 is configured such that the breadth thereof can be intimately received within the outer rebate 13b of vertical member 11 and the inner rebate 14a of horizontal member 12. As all rebates are of identical breadth the plate can be similarly received within any of the other rebates. Furthermore, the extent of the other flange portion 19a corresponds to the width of the end face 18 of the vertical member 11, and forms an outer projection 21 which is rectangular in end cross-section. The one flange portion 19b of the metal plate is disposed within the outer rebate 13b of the first member 11 and is provided with a pair of holes 22 which are countersunk and are adapted to receive a pair of screws 20 to fixed secure the plate to the end face of the member. The depth of the rebates 13 and 14 are complementary to the thickness of the plate 19.

A threaded hole 23 is provided within the metal plate 19 and disposed to align with the groove 17. The horizontal member 12 is provided with a transverse hole 24 in the region of that part of the side face 16a which adjoins the end face 18. The transverse hole 24 extends between opposing rebates 14a, 14b of the opposed side faces 16a and 16b and is positioned to axially register with the threaded hole 23 within the metal plate 19 when the vertical timber member 11 is located into the joining position.

In the joining position, the end face 18 of the vertical timber member 11 with the outer projection of the metal plate 19 is slotted into the corresponding rebate 14a of the horizontal timber member 12, so that the hole 24 registers axially with the threaded hole 23 of the metal plate. A fixing means in the form of a threaded bolt 26 having ahead and shank portion can then be inserted through the transverse hole 24 and screwed into the threaded hole 23. Any extension of the shank portion beyond the inner protruding surface 21 of the plate is accommodated within the groove 17, thereby allowing the second timber member 12 to be clampingly engaged between the bolt head portion 26a and the metal plate 19.

In a preferred form of the embodiment, the rebates and joining members are concealed by the provision of cover means in the form of precisely configured wooden laths 27 and 28 respectively for insertion within the corresponding rebates 13 and 14. The outer lath 27b is provided with a cut-out portion at the lower end 29 thereof to facilitate positioning over the side metal face 19b and the joining end of the horizontal timber member 12. Similarly, the outer horizontal lath 28b is provided with a circular recess 30 at the joining end 31 thereof to facilitate placement over the bolt head 26a. Inner laths 27a and 28a are provided for insertion within the inner cavities 13a and 14a respectively, whereby the protruding portion 21 of the metal plate 19 is concealed. The laths may be fixed into place by any desirable means such as nailing and/or adhering.

In operation, joints of the kind herein described can be made quickly on site, or in the factory, whereby a series of right angle metal plates may be made to a predetermined form, and a series of timber lengths are rebated to the desired form. As the joint is not dependent upon having precisely configured members of substantially differing end configurations as in the traditional mortice and tenon joint, a large number of members can be rebated identically thereby improving economy and efficiency. A longitudinal groove, is then routed within alternate lengths which form the first members, and holes are drilled at the joining part of the opposed side faces of the remaining second members. The metal plates can then be screwed into position at the end faces of the first members, whereupon bolts are simply screwed through the holes to clampingly engage the timber members together. The bolts may be tightened to form a strong rigid joint of extreme inherent accuracy. If desired the rebates and joining members may then be covered by inserting appropriately configured laths within the rebates.

The second embodiment is substantially the same as the first embodiment, except that the groove 17 is provided within the outer rebate 13b and the tapped hole 23 and hole 24 are aligned with respect thereto. In addition, a protruding stock portion is provided in place of the inner rebate 13a and the other flange portion 19a is adapted to extend inwardly to provide a continuation of the protruding stock portion receivable within the inner rebate 14a. Accordingly the provision of the lath 27a is obsolete.

Figure 4:
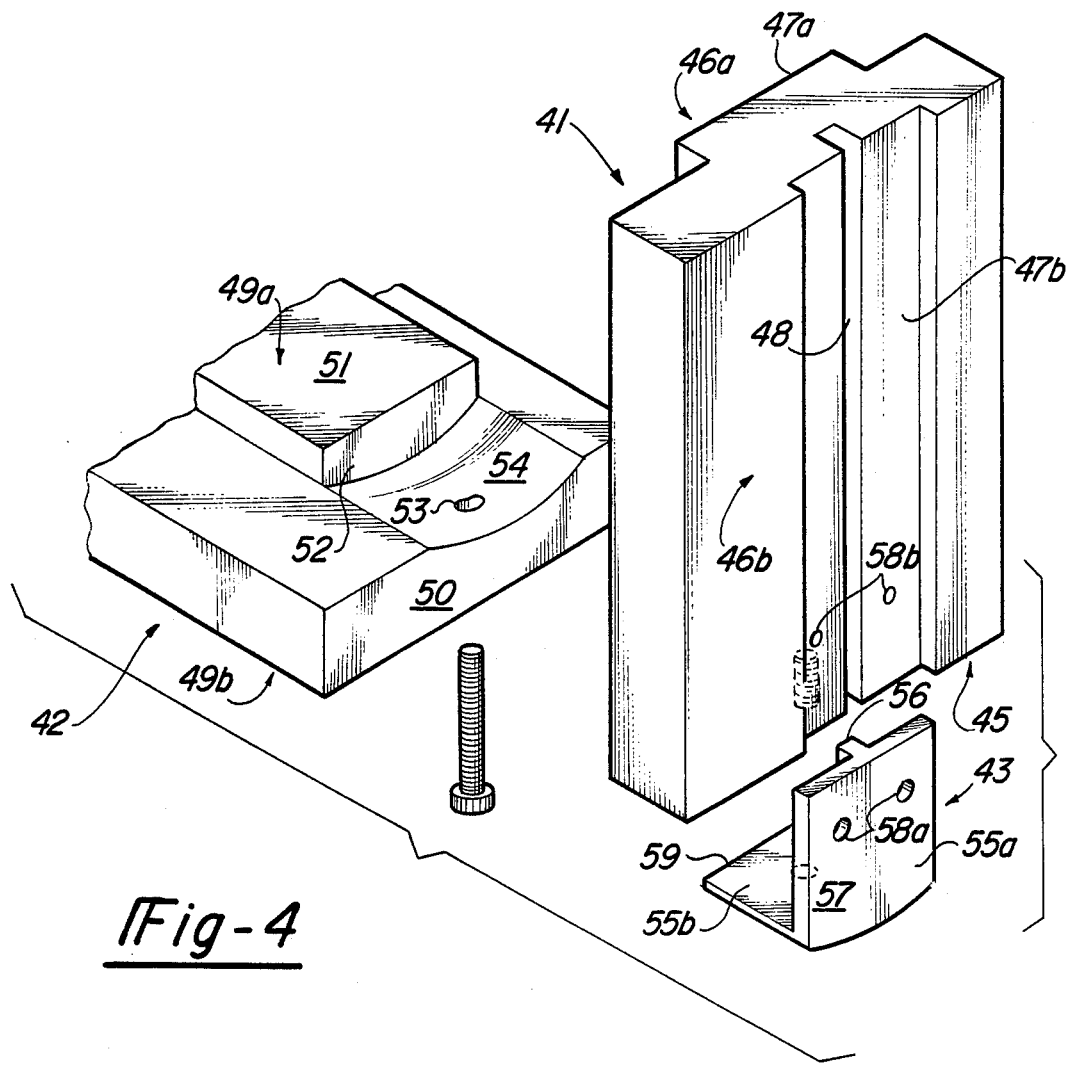
FIG. 4 is an outer perspective view of the joint in accordance with another embodiment of the invention.
Figure 5:
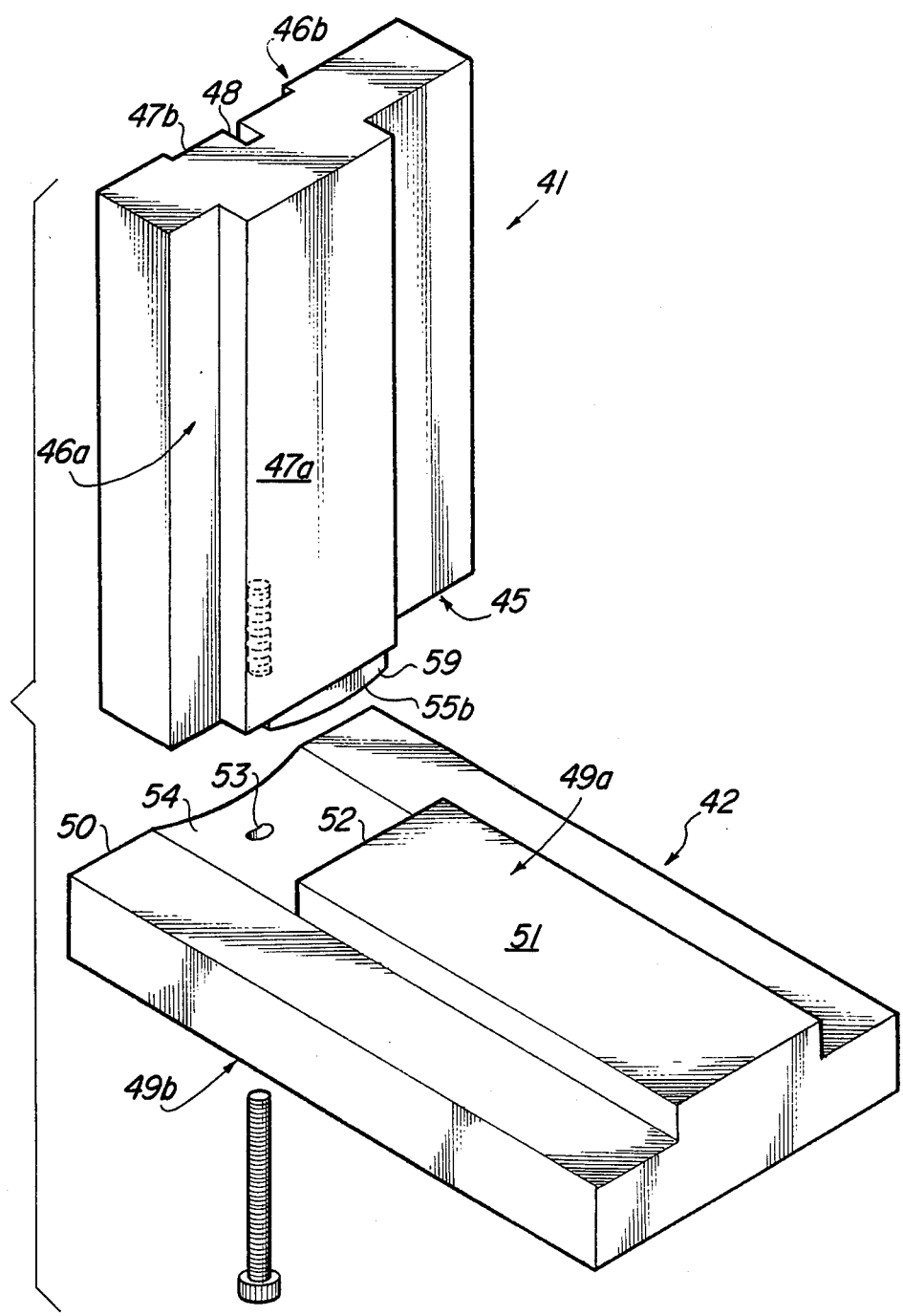
FIG. 5 is an inner perspective view of the joint shown in FIG. 4.

The third embodiment of the invention is substantially the same as the preceding embodiments and is shown at FIGS. 4 and 5 of the accompanying drawings.

The joint generally consists of a first member 41, second member 42, bracket means 43 and fixing means (not shown). The first member 41 is provided with an end face 45 and has two opposing side faces 46a, 46b. The inner opposing side face 46a is rebated to define a central longitudinally extending protruding stock portion 47a, and the outer opposing side face 46b is rebated to define a central longitudinal recess 47b, extending in a similar manner to the stock portion. Centrally disposed of the longitudinal recess 47b is a longitudinal groove 48.

The second member 42 is formed similar to the first member having opposed side faces 49a, 49b and an end face 50, but is not provided with a longitudinal recess in its outer side face 49b. In addition, the inner stock portion 51 thereof is terminated at a point 52 spaced from the end face 50 of the second member a distance corresponding to the width of the end face 45 of the first member. In this intermediate region between the point 52 and the end face 50, the surface of the second member is routed to provide a recess 54 having a concavely curved surface, the reason for which should become apparent later. Disposed a prescribed distance from the end face 50 of the second face, which corresponds to a distance commensurate with the distance between the outer side face 49b and a point located within the groove 48, is a transverse hole 53 extending between the opposed side faces 49 in the region of the recess 54. The transverse hole 53 is prferably arranged to align axially with the groove 48.

The bracket means 43 consists of a pair of flange portions 55 tansversely disposed to each other and is formed of material having both sufficient compressive and tensile strength characterics for joinery manufacture such as metal of suitable plastics. One flange portion 55a extends in a direction substantially parallel to the longitudinal axis of the first member and is provided with an inner protrusion 56, complementary to the shape and size of the groove. The other flange portion 55b overlies the end face 45 providing an outer projection thereon. The outer projection is shaped to be convexly curved only in its end cross-section to complement the shape of the recess 54 and is provided with a threaded hole (not shown) which registers in axial alignment with the transverse hole 53 and the groove 48, when the bracket means is correctly positioned. The bracket means 43 is located on the end face 45 of the second member by inserting the protrusion 56 within the groove 48. The thickness of the one flange portion is approximately the same as the depth of the longitudinal recess 47b to provide an outer surface 57 flush with the outer side face 46b. In addition the bracket means is fixedly mounted to the first member 41 by means of a pair of screws (not shown) inserted in registering holes 58a, 58b provided in the one flange portion 55a and longitudinal recess 47b respectively. The inner protrusion 56 terminates short of the inner common wall of the groove 48 thus defining a side closure to the same adjacent to the threaded hole and so forming a void inwardly of the hole. The distal end 59 of the other flange portion 55b terminates adjacent the stock portion (as opposed to the first embodiment where it terminated adjacent the recess 13a) and the common end 60 of the bracket means is disposed adjacent the longitudinal recess 47b.

The fixing mean is identical to that of the previous embodiment comprising a threaded bolt having a head portion and a shank portion.

To join the two members together, the bracket means 43 is fixedly mounted to the first member 41 in the manner previously described. The first member is then placed in butting relation with the inner side face 49a so that the outer projection of the other flange portion 55b of the bracket means is accommodated within the recess 54. In the correct position, the transverse hole 53 axially registers with the threaded hole and the longitudinal groove 48. Subsequently, the fixing means may be inserted within the holes and screwed to threadedly engage the second hole and so clampingly engaging the second member to the first by the action of the head portion on the outer side face 49b and the shank portion on the other flange portion 55b. Further engaging surfaces are provided which engage the shank portion, namely the surface of the transverse hole 53, the surfaces of the groove 48, which is of a width to approximate the hole diameter, and the terminating surface of the inner protrusion 56, the latter two engaging the extension of the shank portion beyond the threaded hole.

Upon clampingly engaging the two members together it can be seen that the outer projection of the other flange portion of the bracket means operates with the completementary shaped recess to oppose rotational movement of the first member about its longitudinal axis relative to the second member. This is effective in using an outer projection/recess contour of the shape proposed in any of the embodiments herein described.

It should be appreciated that the scope of the present invention is not limited to the scope of the specific embodiment herein described. Particularly, the provision of covering laths may be dispensed with in situations which do not require aesthetic considerations. Furthermore, it is not an essential feature of the present invention to have rebates, mortices or tenons which extend the entire length of a timber member, although this is a highly desirable aspect of the invention. In addition, the present invention is not limited to application with elongate timber lengths but may be used in relation to panels or materials of substances other than timber whereby the joint herein described may be suitably applied.

I claim:

1. A joint for joining first and second elongate members to each other in opposed relation said first member having an end face; said second member having a pair of generally opposed side faces, said end face of said first member being in abutting relation with one of said side faces of said second member; a bracket means having a pair of flange portions disposed in angular relation to each other; and a fixing means; said bracket means being fixedly mounted to said end face such that one flange portion extends substantially parallel to a longitudinal axis of said first member and in juxtaposition therewith, and the other flange portion projects in part outwardly from the general plane of said end face; said one side face being formed with a preformed recess extending longitudinally along said side face and being complementary to and receiving the projecting part of said other flange portion; said first member being buttingly joined to said one side face of said second member by said fixing means clampingly engaging said second member to said other flange portion, the engagement between said other flange portion and said recess opposing rotational movement of said bracket and of said first member about its longitudinal axis relative to said second member.

2. A joint as claimed in claim 1, wherein the projecting part of said other flange portion is rectangular in end cross-section.

3. A joint as claimed in claim 1, wherein the projecting part of said other flange is convexly curved in end cross-section thereof only.

4. A joint as claimed in claim 1, wherein the fixing means comprises a threaded bolt having a head and shank portion, said second member being provided with a transverse hole extending between said opposed side faces, and the other flange portion being provided with a threaded hole registering with said transverse hole, said fixing means being received within said holes with said head portion engaging the other side face and said shank portion threadedly engaging said other flange portion for clamping the members together.

5. A joint as claimed in claim 4, wherein said first member is provided with a longitudinal recess on one side face thereof extending transversely to the other flange portion, said longitudinal recess defining a void inwardly of said threaded hole to accommodate any extension of said shank portion of the threaded bolt.

6. A joint as claimed in claim 5, wherein said longitudinal recess is provided by a longitudinal groove axially aligned with said threaded hole, the width of said groove being complementary to the diameter of said threaded hole to provide a further engaging surface to said extended shank portion.

7. A joint as claimed in claim 5, wherein the distal end of said other flange portion terminates adjacent the recess.

8. A joint as claimed in claim 5, wherein the common end of said bracket means is disposed adjacent the recess.

9. A joint as claimed in claim 5, wherein said longitudinal recess extends substantially the entire length of said first member.

10. A joint as claimed in claim 6, wherein said bracket means is provided with an inwardly directed protrusion on the face of said one flange portion facing said first member and extending within said groove so locating the bracket means relative to the first member.

11. A joint as claimed in claim 10, wherein said protrusion partially extends within said groove and forms an outer side closure to the same adjacent said threaded hole to provide another engaging surface to said extended shank portion.

12. A joint as claimed in claim 1, wherein the joint includes cover means to conceal said bracket means.

13. A joint as claimed in claim 12, wherein said cover means is a lath insertable within a longitudinal recess formed in a side of said first member into which said one flange portion extends.

14. A joint as claimed in claim 1, wherein the members are of generally the same cross-sectional shape.

15. A joint as claimed in claim 1, wherein said bracket means is formed of material having both sufficient compressive and tensile strength characteristics to resist rotational movement of said joint.

16. A joint as claimed in claim 1, wherein the first member is provided with a recess in a side face thereof opposing the first flange portion of the bracket means, said first flange portion extending into said recess of said first member and cooperating therewith to oppose rotational movement of said bracket and of said first member relative to said second member.

17. A joint as claimed in claim 16, wherein the recess in the first member is formed with a groove at the base thereof, said one flange portion having an inwardly extending ridge received within said groove.

18. A bracket for joining two elongated members comprising a pair of angularly related integrally connected flange portions each adapated to be positioned in a butting relationship with a respective end and side face of one of said members, and an inwardly extending ridge formed on one of said flange portions and adapted to engage a groove in the one of the members for resisting rotation of said bracket relative to the one member, and an internally threaded hole in the other of the flange portions adapted to receive a fastening means.

* * * * *